Patented Sept. 9, 1952

2,610,177

UNITED STATES PATENT OFFICE 2,610,177

RIBOFLAVIN MONOPHOSPHORIC ACID ESTER SALTS AND METHOD OF PREPARATION

Leo A. Flexser, Upper Montclair, and Walter G. Farkas, Nutley, N. J., assignors to Hoffmann-La Roche Inc., Nutley, N. J., a corporation of New Jersey No Drawing. Application November 8, 1950, Serial No. 194,734

15 Claims. (Cl. 260—211.3)

This invention relates to diethanolamine salts and morpholine salts of riboflavin monophosphoric acid ester and to a method for fractionating mixtures of isomers of riboflavin monophosphoric acid ester.

Of the various isomers of riboflavin monophosphoric acid ester, only the 5'-isomer is fully biologically active. Accordingly, it is highly desirable to obtain this substance in pure form, substantially free from the other isomers. However, the properties of the isomers are so nearly identical that separation of the 5'-isomer from the others is very difficult.

We have found unexpectedly that the diethanolamine and the morpholine salts of riboflavin-5'-monophosphoric acid ester have sufficiently different solubility characteristics from the corresponding salts of the other isomers of riboflavin monophosphoric acid ester to enable a ready separation of the desired 5'-isomer in substantially pure form. These new diethanolamine and morpholine salts of the riboflavin-5'-monophosphoric acid ester are also useful substances per se physiologically since they provide the biologically active 5'-isomer in a highly soluble non-toxic form suitable for therapeutic use. However, if desired, these salts may easily be converted to the free 5'-monophosphoric acid ester by simple acidification, as for example, with a mineral acid, of their aqueous solutions whereupon the 5'-acid ester crystallizes in pure form.

Thus, in one of its aspects the invention is concerned with the recovery of riboflavin-5'-monophosphoric acid ester from a mixture thereof with other isomers of riboflavin monophosphoric acid ester. Another aspect of the invention is concerned with the production of the new diethanolamine and morpholine salts of riboflavin monophosphoric acid ester. A still further aspect of the invention embraces the method of preparing the diethanolamine and morpholine salts of riboflavin monophosphoric acid ester.

In accordance with the present invention, a mixture containing riboflavin-5'-monophosphoric acid ester and other isomers of riboflavin monophosphoric acid ester is reacted with an amine selected from the group consisting of diethanolamine and morpholine to form a mixture of the corresponding amine salts of the isomers of riboflavin monophosphoric acid ester. The amine salt of the riboflavin-5'-monophosphoric acid ester is then separated from the mixture, e. g., by fractional crystallization, which may be carried out by adding a water-miscible solvent, such as ethanol, isopropanol or acetone, to an aqueous solution of the mixture of the amine salts of the isomers. The corresponding amine salts of the other isomers remain dissolved in the mother liquor, and can be recovered as a mixture by evaporation of the mother liquor. The diethanolamine and morpholine salts of riboflavin-5'-monophosphoric acid ester are readily converted into the free riboflavin-5'-monophosphoric acid ester by treatment with a suitable acid.

In the reaction of the mixture of isomers of riboflavin monophosphoric acid ester with the aforesaid amines, either the mono- or the di- amine salts or mixtures thereof may be formed, depending upon the quantity of the amine employed. A potentiometric titration curve of riboflavin monophosphoric acid ester titrated with diethanolamine or morpholine shows a sharp point of inflection at about pH 4 when one mole of the amine per mole of riboflavin monophosphoric acid ester has been added. When a second mole of amine is added, the pH rises gradually to about 7, where a hardly noticeable second point of inflection occurs, thus indicating that the second mole of amine is rather weakly bound in the di- salt. When a water-miscible solvent, e. g., ethanol, isopropanol, or acetone, is added to the aqueous solutions of the amine salts, a salt is precipitated which may be the mono- or the di- amine salt or a mixture thereof, depending upon the pH at which the precipitation is carried out. At a pH of about 4, the precipitated salt is practically exclusively the mono- amine salt, while at a pH of at least about 9, the precipitated salt is mainly the di- amine salt. At intermediate pH's, mixtures of the mono- and di- amine salts are obtained, though even at pH 7 predominantly the mono- amine salt is obtained. Regardless of whether the mono- or di- amine salts or mixtures thereof are obtained, fractional crystallization results in separation of the corresponding amine salts of the desired 5'-isomer of riboflavin monophosphoric acid ester. We prefer, however, to employ the mono- amine salts because of their greater stability.

In a preferred manner of practicing our process, an aqueous solution comprising riboflavin-5'-monophosphoric acid ester and other isomers of riboflavin monophosphoric acid ester is adjusted to a pH of at least about 4 and preferably within the range of about 4–10, with diethanolamine or morpholine, and then fractionally crystallized with a water-miscible solvent, e. g., ethanol, isopropanol, or acetone to obtain the corresponding salts of riboflavin-5'-monophosphoric acid ester. As pointed out hereinbefore, either the mono- or di- amine salts or mixtures thereof can be obtained, depending upon the particular adjustment of the pH. If desired, after adjusting the pH, the amine salts of the mixture of the isomers of riboflavin monophosphoric acid ester can be recovered, as by evaporating the solution in vacuo prior to the step of fractional crystallization.

It will be understood that the process for recovering the riboflavin-5'-monophosphoric acid ester, and the diethanolamine, and morpholine salts thereof, is applicable to any mixture of the 5'-isomer with the other isomers, e. g., the 2'-, 3'- and 4'- isomers, regardless of the source of said mixture. The following example is illustrative of the preparation of a mixture to which the process may be applied.

Example A 7.2 grams of water (0.4 mole) were slowly added to 61.3 grams of phosphorus oxychloride (0.4 mole) with stirring and cooling to 20–25° C. Agitation was continued until evolution of hydrogen chloride gas had mostly subsided. The mixture was allowed to stand at room temperature for about 16 hours. 7.52 grams of riboflavin (.02 mole) were added with stirring. Complete solution of the riboflavin occurred in about five minutes. Agitation was continued for six hours at room temperature during which time hydrogen chloride gas was evolved. The solution was then poured into 150 cc. of water, the temperature being allowed to rise to 80–90° C. After fifteen minutes, the resulting clear dark-red solution was cooled to about 20° C. A mixture of isomers of riboflavin monophosphoric acid ester slowly crystallized. The product was filtered off, washed with normal hydrochloric acid, alcohol and ether, and dried. The main component of the product was riboflavin-5'-monophosphoric acid ester which was present to the extent of about 68 per cent in the mixture. The other components included one or more of the 2'-, 3'-, and 4'- isomers of riboflavin monophosphoric acid ester.

The following examples will serve to illustrate the method for preparing the new salts and for separating the 5'-isomer from the other isomers present in the mixture of isomers of riboflavin monophosphoric acid ester.

Example 1

9.2 grams of a mixture containing riboflavin-5'-monophosphoric acid ester and other isomers of riboflavin monophosphoric acid ester, obtained as in Example A, were slurried in about 150 cc. of water and the pH brought to 7.0 by addition of morpholine whereupon, after a slight warming, a solution was obtained. The solution was filtered clear from a minor amount of undissolved material and five volumes of ethanol were added. Monomorpholine salt of riboflavin -5'-monophosphoric acid ester precipitated and was filtered off, washed with ethanol and dried. The precipitated salt was substantially pure 5'- isomer. The other isomers of riboflavin monophosphoric acid ester were contained in the mother liquor and recovered therefrom by evaporation of the mother liquor in vacuo.

The monomorpholine salt of riboflavin-5'-monophosphoric acid ester is obtained as a water-soluble yellow powder usually containing two molecules of water of crystallization. Upon heating, the compound darkens and melts at 202–204° C., with decomposition.

Example 2

2.0 grams of a mixture containing riboflavin-5'-monophosphoric acid ester and other isomers of riboflavin monophosphoric acid ester, obtained as in Example A, were slurried in 20 cc. of water and sufficient diethanolamine added to raise the pH to 8.8 whereupon solution was readily obtained. The solution was filtered clear from a minor amount of undissolved material. The pH was brought to 4.8 by addition of a small amount of acetic acid. Five volumes of ethanol were added to the solution whereupon precipitation occurred. The precipitate was filtered off and redissolved in ten parts of water by addition of diethanolamine to a pH of 8.0. The solution was filtered clear from a minor amount of undissolved material. The pH was brought to 4.8 by addition of acetic acid and the diethanolamine salt of riboflavin monophosphoric acid ester was precipitated by addition of five volumes of ethanol. The product was filtered off, washed with ethanol and dried. It was substantially pure diethanolamine salt of riboflavin-5'-monophosphoric acid ester. A mixture of the diethanolamine salts of the other isomers was contained in the mother liquor and was recovered by evaporating the mother liquor in vacuo.

The monodiethanolamine salt of riboflavin-5'-monophosphoric acid ester is obtained as a highly water-soluble yellow powder usually containing two molecules of water of crystallization. The pH of its aqueous solution is about 4 to 5. The compound darkens upon heating and melts at 201–203° C., with decomposition.

Example 3

5.0 grams of a mixture containing riboflavin-5'-monophosphoric acid ester and other isomers of riboflavin monophosphoric acid ester, obtained as in Example A, were slurried in 100 cc. of water and sufficient diethanolamine was added to bring the pH to 9.6, whereupon solution was readily obtained. The solution was then filtered clear from a minor amount of undissolved material. Six volumes of acetone were added slowly while stirring. The di-diethanolamine salt of riboflavin-5'-monophosphoric acid ester crystallized in small needles, and the crystalline product was filtered off, washed with acetone, ether and dried. It was substantially pure di-diethanolamine salt of riboflavin-5'-monophosphoric acid ester.

Example 4

5.0 grams of a mixture containing riboflavin-5'-monophosphoric acid ester and other isomers of riboflavin monophosphoric acid ester, obtained as in Example A, were slurried in 100 cc. of water and sufficient morpholine was added to bring the pH to 10.0, whereupon solution was readily obtained. The solution was filtered clear from a minor amount of undissolved material. About 10 volumes of isopropanol were then added. The di-morpholine salt of riboflavin-5'-monophosphoric acid ester crystallized in small needles. The crystalline product was filtered off, washed with isopropanol, ether and dried. It was substantially pure di-morpholine salt of riboflavin-5'-monophosphoric acid ester.

The diethanolamine and morpholine salts of riboflavin-5'-monophosphoric acid ester, can be converted to the free riboflavin-5'-monophosphoric acid ester by treatment with a suitable acid as illustrated by the following procedure, at least one equivalent of the acid being employed in the case of the mono-salts and at least two equivalents in the case of the di-salts.

5 grams of the monodiethanolamine salt of riboflavin-5′-monophosphoric acid ester were dissolved in 75 cc. of water and to the resulting solution were added 7 cc. of concentrated hydrochloric acid. Riboflavin-5′-monophosphoric acid ester precipitated and was filtered off. In a similar manner, the monomorpholine, the di-diethanolamine and di-morpholine salts of riboflavin-5′-monophosphoric acid ester could be converted to the riboflavin-5′-monophosphoric acid ester.

This application is a continuation-in-part of our application Serial No. 141,585, filed January 31, 1950, now abandoned.

We claim:

1. A process which comprises reacting in an aqueous medium a mixture containing riboflavin-5′-monophosphoric acid ester and positional phosphate isomers of said riboflavin monophosphoric acid ester with an amine selected from the group consisting of diethanolamine and morpholine, and separating the corresponding amine salt of riboflavin-5′-monophosphoric acid ester from the resulting solution, by treating said solution with a water-miscible solvent to fractionally crystallize the amine salt of riboflavin-5′-monophosphoric acid ester therefrom.

2. The process in accordance with claim 1, wherein the said amine salt of riboflavin-5′-monophosphoric acid ester is converted into riboflavin-5′-monophosphoric acid ester by treatment with an acid.

3. A process in accordance with claim 1, wherein the reaction with the amine is carried out by adjusting the aqueous medium to a pH of at least about 4 with the said amine.

4. A process which comprises adjusting an aqueous solution comprising riboflavin-5′-monophosphoric acid ester and positional phosphate isomers of said riboflavin monophosphoric acid ester to a pH of about 4 with diethanolamine, and treating the solution with a water-miscible solvent to separate the monodiethanolamine salt of riboflavin-5′-monophosphoric acid ester therefrom.

5. A process of recovering diethanolamine salts of riboflavin-5′-monophosphoric acid ester from a mixture containing these salts and the corresponding diethanolamine salts of positional phosphate isomers of said monophosphoric acid ester, which comprises treating an aqueous solution of said mixture with a water-miscible solvent to fractionally crystallize the diethanolamine salt of riboflavin-5′-monophosphoric acid ester from said solution.

6. A process for recovering morpholine salts of riboflavin-5′-monophosphoric acid ester from a mixture containing these salts and the corresponding morpholine salts of positional phosphate isomers of said riboflavin monophosphoric acid ester, which comprises treating an aqueous solution of said mixture with a water-miscible solvent to fractionally crystallize the morpholine salt of riboflavin-5′-monophosphoric acid ester from said solution.

7. A compound of the group consisting of the diethanolamine salts and morpholine salts of riboflavin-5′-monophosphoric acid ester.

8. The monodiethanolamine salt of riboflavin-5′-monophosphoric acid ester.

9. The di-diethanolamine salt of riboflavin-5′-monophosphoric acid ester.

10. The monomorpholine salt of riboflavin-5′-monophosphoric acid ester.

11. The di-morpholine salt of riboflavin-5′-monophosphoric acid ester.

12. A process which comprises reacting in an aqueous medium, and at a pH of about 9, a mixture containing riboflavin-5′-monophosphoric acid ester and positional phosphate isomers of said riboflavin monophosphoric acid ester with an amine selected from the group consisting of diethanolamine and morpholine, and separating the corresponding amine salt of riboflavin-5′-monophosphoric acid ester from the resulting solution by treating said solution with a water-miscible solvent to fractionally crystallize said corresponding amine salt of riboflavin-5′-monophosphoric acid ester therefrom.

13. A process which comprises reacting in an aqueous medium, and at a pH of about 4, a mixture containing riboflavin-5′-monophosphoric acid ester and positional phosphate isomers of said riboflavin monophosphoric acid ester with an amine selected from the group consisting of diethanolamine and morpholine, and separating the corresponding amine salt of riboflavin-5′-monophosphoric acid ester from the resulting solution by treating said solution with a water-miscible solvent to fractionally crystallize said corresponding amine salt of riboflavin-5′-monophosphoric acid ester therefrom.

14. A process which comprises reacting in an aqueous medium a mixture containing riboflavin-5′-monophosphoric acid ester and positional phosphate isomers of said riboflavin monophosphoric acid ester with diethanolamine, and separating the resulting diethanolamine salt of riboflavin-5′-monophosphoric acid ester from the resulting solution by treating said solution with a water-miscible solvent to fractionally crystallize the diethanolamine salt of riboflavin-5′-monophosphoric acid ester therefrom.

15. A process which comprises reacting in an aqueous medium a mixture containing riboflavin-5′-monophosphoric acid ester and positional phosphate isomers of said riboflavin monophosphoric acid ester with morpholine, and separating the resulting morpholine salt of riboflavin-5′-monophosphoric acid ester from the resulting solution by treating said solution with a water-miscible solvent to fractionally crystallize the morpholine salt of riboflavin-5′-monophosphoric acid ester therefrom.

LEO A. FLEXSER.
WALTER G. FARKAS.

REFERENCES CITED

The following references are of record in the file of this patent:

UNITED STATES PATENTS

| Number | Name | Date |
|---|---|---|
| 2,111,491 | Kuhn et al. | Mar. 15, 1938 |
| 2,535,385 | Breivogel | Dec. 26, 1950 |